(12) United States Patent
Zhang

(10) Patent No.: US 11,463,469 B2
(45) Date of Patent: Oct. 4, 2022

(54) MULTIPLE SOURCED CLASSIFICATION

(71) Applicant: FORESCOUT TECHNOLOGIES, INC., San Jose, CA (US)

(72) Inventor: Yang Zhang, Fremont, CA (US)

(73) Assignee: FORESCOUT TECHNOLOGIES, INC., San Jose, CA (US)

(*) Notice: Subject to any disclaimer, the term of this patent is extended or adjusted under 35 U.S.C. 154(b) by 169 days.

(21) Appl. No.: 16/834,921

(22) Filed: Mar. 30, 2020

(65) Prior Publication Data

US 2021/0306368 A1    Sep. 30, 2021

(51) Int. Cl.
*H04L 9/40* (2022.01)
*G06N 20/00* (2019.01)

(52) U.S. Cl.
CPC ...... *H04L 63/1433* (2013.01); *H04L 63/1408* (2013.01); *G06N 20/00* (2019.01)

(58) Field of Classification Search
CPC .. H04L 63/1433; H04L 63/1408; G06N 20/00
See application file for complete search history.

(56) References Cited

U.S. PATENT DOCUMENTS

| | | | |
|---|---|---|---|
| 8,146,148 B2 * | 3/2012 | Cheriton | H04L 63/0272 726/15 |
| 9,686,312 B2 * | 6/2017 | Di Pietro | G06F 21/577 |
| 2013/0041932 A1 * | 2/2013 | Moore | H04L 47/32 455/524 |
| 2015/0326609 A1 * | 11/2015 | Cruz Mota | H04L 41/30 726/1 |
| 2017/0364794 A1 * | 12/2017 | Mahkonen | H04L 47/2441 |
| 2018/0082058 A1 * | 3/2018 | Ferragut | H04L 63/1425 |
| 2018/0139217 A1 * | 5/2018 | Snapiri | H04L 63/0254 |
| 2019/0098035 A1 * | 3/2019 | Periaswamy | G05B 19/0428 |
| 2019/0306731 A1 * | 10/2019 | Raghuramu | H04W 48/16 |

FOREIGN PATENT DOCUMENTS

WO    WO-2020019063 A1 *    1/2020    ......... H04L 63/102

\* cited by examiner

*Primary Examiner* — Sarah Su
(74) *Attorney, Agent, or Firm* — Womble Bond Dickinson (US) LLP

(57) ABSTRACT

Systems, methods, and related technologies for improving classification use multiple classification resources. Network traffic from a network may be accessed and an entity may be selected. One or more values associated with one or more properties associated with the entity may be determined. The one or more values may be accessed from the network traffic. A first classification result of the entity based on accessing one or more local profiles is determined by a processing device. In response to the first classification result meeting a condition, one or more values associated with one or more properties associated with the entity may be sent (e.g., to a cloud based classification resource). A second classification result may be received. The second classification result may be determined based one accessing at least one remote profile. At least one of the first classification result or the second classification result may be stored.

20 Claims, 8 Drawing Sheets

MULTIPLE SOURCED CLASSIFICATION

TECHNICAL FIELD

Aspects and implementations of the present disclosure relate to network monitoring, and more specifically, classification of entities of a network.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
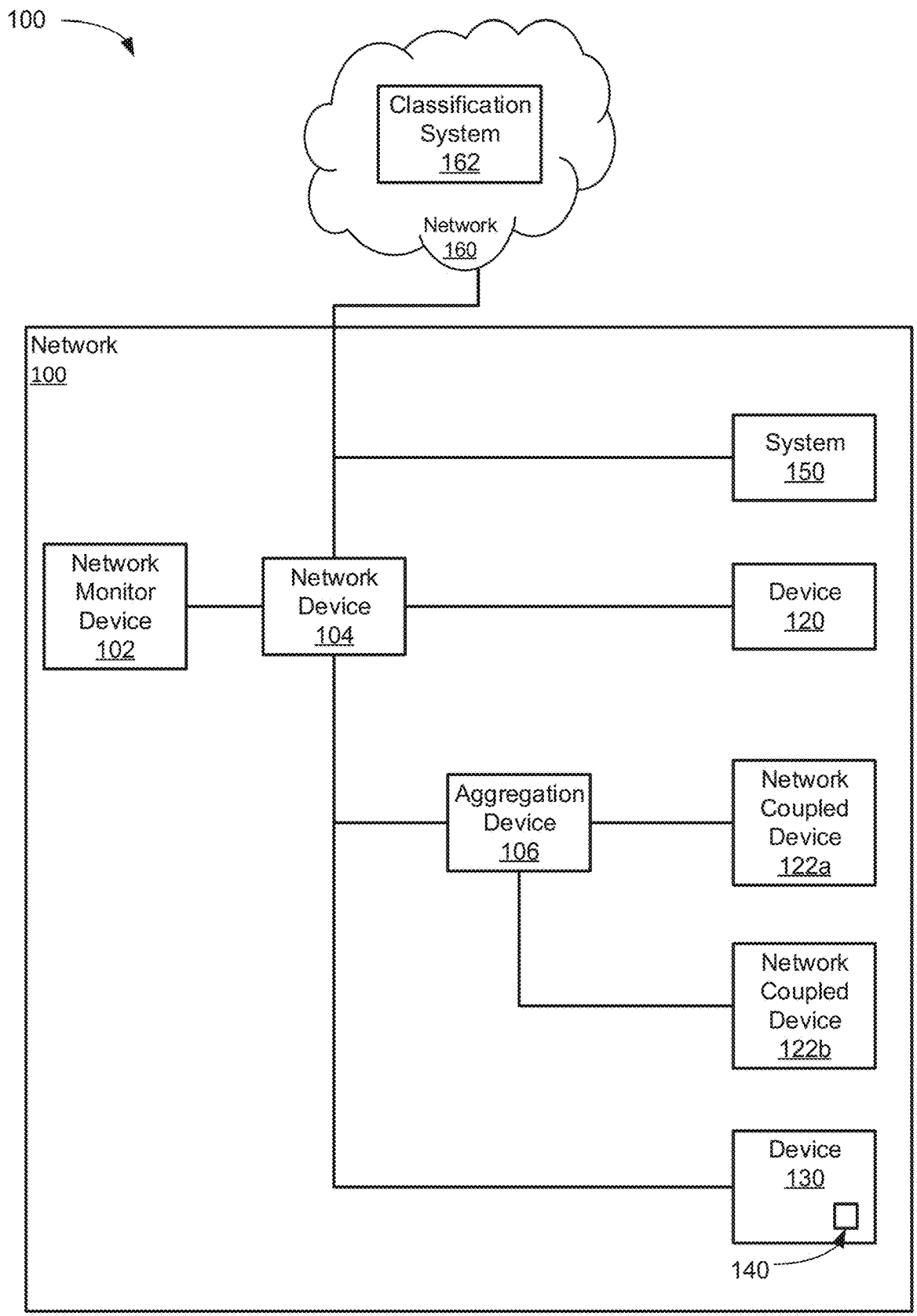
FIG. 1 depicts an illustrative communication network in accordance with one implementation of the present disclosure.

Aspects and implementations of the present disclosure are directed to classification (but may be applicable in other areas). The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras, wearable devices, medical devices, etc.) can make it difficult to effectively ensure that network security is maintained. Classification can be particularly important for securing a network because lack of knowledge about what a device is can prevent application of appropriate security measures.

Accordingly, described herein in various implementations are systems, methods, techniques, and related technologies, which enable better classification by using a distributed approach that leverages both local classification and cloud based classification. The usage of both local classification and cloud based classification enables leveraging of the advantages of each classification environment to achieve more accurate and granular classifications. The improved classification thereby enables increases in visibility into the entities communicatively coupled to one or more networks.

Device visibility becomes more and more important as the number of devices and diversity of devices increases. Detecting or discovering devices in a network is likely not enough to protect the network. With the increasing number and diversity of devices, local classification can be limited by local resources such as storage, processing capabilities, etc. For example, local computing resources may not support adding increasingly large number of profiles and have insufficient processing resources to perform classification using the increasingly large number of profiles.

There may also be issues with fingerprints or profiles being updated according to a periodic release schedule. This can mean that additional or updated profiles may be available but not in use until a periodic release is available. Further, a user may have to manually update the profiles being used for classification, e.g., by downloading the updated profiles. This can result reduce classification effectiveness.

A fingerprint or profile is a minimal set of distinguishing characteristic information and relationships between the characteristic information (e.g., Boolean logic relationships) represented in a well-known format (e.g., extensible markup language (XML)) which can be used to uniquely and accurately identify a given entity (e.g. a Samsung Galaxy™ S8 running Android™). Entity profiling or classification refers to the process of identifying entities in a network by a network entity (e.g., a network monitor entity, for instance, network monitor device 102 or 280) using a set of device profiles. Many different properties may be relied on to arrive at a classification of an entity or device. The accuracy and granularity of visibility can be correlated with the availability of the specific property values and the specific profile library version. The classification of an entity may thus be determined by matching entity property values with property values of one or more profiles and the entity being classified based on having the most property values of a profile matched.

Embodiments include a next generation classification architecture which dual classification engines or resources which can overcome the above mentioned limitations and reduce dependency on local infrastructure. Embodiments may be able to function as a hybrid classification model. A first or local engine can be onboard, local, or on premise engine that can determine a classification of a device or an entity (e.g., based on network traffic). The local engine can access or receive a periodically released profile library to update its local profile library used for classification. In some embodiments, the local engine can perform a quick local classification in which the classification result can be determined immediately or nearly so. For devices or entities that are classified by the local engine meeting certain conditions, e.g., sufficient confidence, sufficient granularity, etc., or a combination thereof may not need further validation.

A second or cloud engine or resource can be located remotely, e.g., in a cloud computing environment, and have more resources available, e.g., storage and processing resources, than available in the local infrastructure of the local engine. The cloud engine can access each profile that is available including the most recently available profiles, less common profiles, and access data uploaded from one or more networks (e.g., where a network monitor entity is monitoring each network). In some embodiments, the cloud engine may be contacted by a local engine in two cases: 1) an entity is unclassified by a local engine or meets a condition, or 2) there is a signal from the cloud resource that the matched fingerprint or profile has a new version in the cloud. The cloud engine may thus be used to provide a second opinion of a classification result. As new profiles are developed, these will be available to the cloud engine enabling the profiles to be available to customers via the cloud engine immediately or nearly so.

The use of a local classification engine and a cloud classification engine further provides flexibility to leverage the most matched or popular profiles. The most matched or popular profiles can be determined based on a combination of the most matched profiles on one or more networks (e.g., local and remote enterprise networks) and the most matched profiles on a global basis as determined by a cloud resource, as described herein. The most popular profiles can be stored locally to be available for the local classification engine and conserve storage and memory resources. This may reduce the number of profiles that are used to perform classification thereby reducing the resources, including overhead, involved in classification. The least popular profiles can get stored in the cloud thereby conserving local resources. This will reduce the amount of bandwidth needed for cloud classification while also reducing the needs in terms of local memory, processing power, and other resources. For example, with the most popular profiles stored locally, 90% of entities may be matched while classification of the remaining 10% of entities may be classified using a cloud resource. In some embodiments, unmatched profiles can be removed to further reduce memory and storage usage.

The use of the most popular profiles locally can reduce processing resource requirements as messaging between different modules of a network monitoring entity (e.g., network monitor 102 or 280) by keeping the number of profiles and associated messaging with each profile down. The classification may not scale well if there is a check of each profile with each set of data associated with an entity as the number of profiles increases. For example, checking 1,000 sets of data associated with 1,000 entities with 6,000 profiles, may result in possibly 6,000,000 messages between modules.

The freeing of local resources allows for more resources to be used for more resource intensive properties associated with an entity. For example, certain properties may be gathered by a network monitor entity logging into an entity, running a script, and determining one or more properties from the output of the script. This can be a time intensive and compute intensive process, e.g., as compared to other properties that can be determined from network traffic. Freeing up local processing resources can allow for more intensive properties to be examined.

Embodiments can further optimize the profiles stored and used locally for classification based on user input including a selected vertical and selection of one or more package of profiles. A user may be provided the option to choose the vertical or industry of the business associated with the network of the entities that are to be classified. For example, a healthcare user, can select a vertical of healthcare and profile packages for healthcare and general IT. The healthcare user can further select not to have industrial OT profiles locally based on not having industrial OT devices or entities in their environment or network. As another example, a financial services company user can choose not have healthcare profiles locally due to not having healthcare entities in their environment. Embodiments can thus give users the flexibility to select the most useful, popular, or likely profiles to be stored and used locally for classification. In some embodiments, user selection of profiles may be combined with popularity (e.g., based on cloud statistics, as described herein) to further filter or refine the profiles that are stored locally. In various embodiments, an initial classification of the entities of a network may be performed after a selection of profiles, e.g., based on vertical, profile packages, and popularity based on cloud data. Popularity associated with each profile may be used to order the profiles for comparison to data associated with an entity (e.g., by the local classification engine, cloud classification engine, or both). For example, the most popular of the popular profiles may be compared to data associated with an entity first or relatively earlier during classification that other profiles.

The vertical may include the industry, e.g., healthcare, power utility, industrial, etc., environment (e.g., branch, data center, campus, etc.), and the types of entities commonly encountered in the environment. In various embodiments, a vertical determined based on one or more entities of the network may be confirmed with a user (e.g., using a notification, displaying a prompt for confirmation, etc.). In some embodiments, the types of entities commonly encountered in the environment may be determined and confirmed with a user. In various embodiments, a determination of a classification and confirmation of the classification with a user may be done based on classification being below a threshold (e.g., a confidence threshold) or a number of unknown devices being above a quantity threshold, etc.

In various embodiments, the multiple classification engines can allow a variety of classification techniques to be used. The local classification engine may use a rule based classification where a rule is satisfied if (each property value of) a profile is matched. The cloud classification engine can solve situations where the local classification result is unknown due to not matching a profile using similarity or proximity matching or machine learning based matching leveraging a large amount of entity information samples stored in the cloud, along with the latest and least popular profiles, as described herein.

The cloud classification engine may be used to further classify an entity with increased granularity and confidence. For example, local classification can be performed and for an entity classification that is below a granularity threshold or a confidence threshold, the data associated with the entity can be sent to the cloud classification engine for further classification. For example, if an entity is classified as being from a particular vendor, the granularity may be below a threshold for the model and functionality and data associated with the entity can be sent to the cloud classification engine for further classification, e.g., to get the model, functionality, operating system and firmware build level. As another example, if an entity is classified as being a network switch with a 60% confidence, the confidence may be below a confidence threshold of 75% and data associated with the entity can be sent to the cloud classification engine for further classification (e.g., to determine a more confident classification).

Confidence of a classification may be based on a reliability of one or more properties used to classify an entity both individually and in combination. For example, if a single property is available (e.g., from network traffic) to match with a profile where the single property has a high reliability, the resulting classification may have a higher confidence than a classification based on multiple properties having a lower reliability. A confidence threshold may be computed based on the similarity of observed network traffic to and from a device as compared to stored network traffic information or a profile.

Granularity may be the specificity to which an entity is classified. The granularity may include the specificity within a hierarchical organization of profiles. For example, a high level classification of an entity as an IT or OT device may be considered to have less granularity than an entity classified to the various levels with increasing granularity of vendor, model, firmware version, or hardware version.

In some embodiments, the cloud engine may further support user validations (e.g., when a user manually changes a classification result with respect to an entity or reclassifies an entity) and how many matches a profile has which can indicate the popularity of the profile. These user validations and profile popularity can be used to select profiles to put into a profile library that is available or released (e.g., periodically) for use by local classification engines (e.g., of network monitor devices, such as network monitor device 102).

Manual classification of a device may be available to allow a user to manually classify an entity. This can be used to modify the confidence scores associated with one or more profiles both locally and in the cloud. Embodiments may check or access data associated with use of the manual classification. Embodiments in response to a user not having used a manual classification function, may notify (e.g., display a message, send a notification, etc.) a user of the manual classification function to encourage the user to manually classify any unknown entity or any entity not classified with enough granularity (e.g., below a threshold, for instance a confidence threshold). Embodiments are able to upload information associated with the manual classification to a repository (e.g., cloud-based repository) or cloud resource (e.g., cloud classification engine) thereby allowing improvement of the profile library (e.g., by updating the profile library based on the information associated with the manual classification).

In some embodiments, a profile may be released and after multiple manual reclassifications the profile can be updated to result in classification results based on the manual reclassifications. For example, if a device is classified as a TV but there are multiple reclassifications (e.g., in a quantity above a selected threshold) to change the classification of the device as a smartphone, the profile may be updated to result in a classification result of a smartphone. In various embodiments, a profile associated with multiple manual reclassifications may not be released as part of a profile library update. This can be done to allow further refinement based on manual reclassifications and other conditions, e.g., based on granularity and confidence thresholds. Embodiments may also support adjusting the confidence score associated with a profile based on each manual reclassification that is received associated with the profile. For example, upon a first manual reclassification the confidence score associated with a profile can be decreased slightly and then decreased more upon each subsequent manual reclassification.

Embodiments may include various components including a local classification engine, an entity profile library, a cloud profile data store (e.g., database), a cloud entity data store (e.g., database), and a cloud classification engine. The local classification engine is able to perform classification locally, track the match history of each profile locally, disable the profiles that are not used, and receive a signal from the cloud engine for profiles that have a new version from the cloud, as described herein.

In some embodiments, receiving a signal of a new profile from the cloud classification engine can enable the local classification engine to send a request to download the new profile thereby enabling improved classification. In various embodiments, the local classification engine may check with the cloud (e.g., cloud classification engine), e.g., periodically every day, to check how many and which profiles have been updated. The local classification engine can then download the profiles that need to be updated locally. The signaling and checking can reduce the amount of time between classification updates substantially (e.g., as compared to periodic releases, for instance, monthly). In some embodiments, the signal of new profiles and responses to the requests to check for new profiles may be include popularity information to update popularity information associated with profiles (e.g., in the cloud).

In some embodiments, the local classification engine can track the match history of each profile locally, determine a local popularity value for each profile, as described herein based on the match history, and disable the profiles or profile packages that are not used. For example, in a hospital environment determined from classification based on profiles matches to a healthcare profile package, one or more profiles associated with industrial OT entities may be disabled or removed (e.g., from the matching process until an entity classification result is unknown).

The local classification engine may further encode, encrypt, and compress data associated with unclassified entities or entities that need further validating or classification (e.g., based on confidence or granularity) and send the data to the cloud engine to get a classification result, as described herein.

The profile library is a library of profiles which can be updated and released for updating local profile libraries (e.g., on a periodic basis) for local classification. The entity profile library may be customized based on popularity, vertical, profile packages, etc., or a combination thereof.

The cloud profile data store is a comprehensive database of profile, effectively having no limitations of the number of profiles or the complexity of profiles. The cloud profile data store is not limited in terms of memory, storage, processing, etc., thereby allowing embodiments to perform matching of profile attributes with multiple properties associated with an entity (e.g., a property of an entity may be compared with multiple attributes or parts of a profile to provide enhanced matching).

The cloud entity data store is an entity information repository for storing uploaded entity information from users or network monitor entities (e.g., network monitor device 102 or 280). In contrast to the cloud profile data store, the cloud entity database can store real entity or actual data in a format of encoded host information (e.g., including device or entity name, operating system, function, vendor/model, host information, etc.).

The cloud classification engine runs on a cloud resource (e.g., cloud compute engine accessing other components from cloud storage). The cloud classification engine can receive requests from the local classification engine, query the cloud profile data store for classification, perform proximity matching, machine learning matching, or other techniques of entities in the cloud entity data store, store the profile match records (e.g., popularity from multiple networks), and report results to the local classification engine. The cloud classification engine can also send an indication to the local classification engine of new added or updated profiles.

The proximity matching can be based on using a data structure, e.g., a matrix, with predefined columns for each feature, each of which are associated with properties of an entity that has been observed (e.g., locally and in the cloud). This matrix can then be used to do similarity matching with properties associated with an entity having a classification result of unknown (e.g., based on local classification). Based on the similarity matching between properties of an entity with properties of a row associated with a previously observed entity, a proximity score (e.g., 80% or 90%) is determined. The proximity score can be used to determine the classification of the entity that has been classified as unknown (e.g., based on local classification). The proximity matching enhances classification by giving better granularity of classification while not needing a strict or rule based match with a profile. In other words, the proximity matches can give classifications that are something close to the proper entity classification. In some embodiments, machine learning matching may be used to augment or in place of proximity matching. The machine learning matching may be used to give a high confidence score match that is substantially a similarity match.

Embodiments may utilize one or more algorithms to perform classification. In some embodiments, the local classification engine may perform an encoding algorithm. The encoding algorithm may be used to encode information about an entity to send to the cloud classification engine. The encoding can keep the data private while reducing the bandwidth required for transmission. The encoding algorithm may further encode the data in a fixed length data structure (e.g., prior to transmission) and encrypt the data. Prior methods have involved anonymizing information about an entity prior to sending the information. This may have the draw back of removing useful information important for classification. Embodiments may use encoding in place of anonymizing. This advantageously enables the cloud classification engine to decode the data and recover the original information will still providing privacy protection. In some embodiments, the encoding algorithm includes a bloom filter or other advanced encoding algorithm which can provide a fixed length data structure so as to substantially compress the data or reduce redundant data (e.g., the values may be stored or transmitted instead of property and value pairs). The fixed length data structure may have property value in each property portion (e.g., variable length) of the fixed length data structure. For example, property one may have a value of '1', property two may have a value of 'true', property three may have a string value.

The cloud classification engine receives and decodes the data (e.g., encoded and encrypted by the local classification engine) to recover the original information. The cloud classification engine can then perform a profile matching based classification (e.g., using data from the cloud profile data store). If there is not a profile match, the cloud classification engine can perform a proximity matching algorithm, as described herein, using the cloud entity data store based on the received information to find a match or a closest matching entity within a similarity or confidence threshold. The cloud classification engine may further use machine learning based matching in combination or in place of the proximity matching algorithm to determine a classification.

The cloud classification engine may also perform a confidence score adjustment algorithm. A confidence score can be used to break a tie when there are multiple profiles that are matched for an entity (e.g., matched simultaneously). The multiple matches may be from a profile match, proximity match, machine learning match, or a combination thereof. The confidence score can be calculated based on multiple factors such as the reliability of the properties of the profile being used, the popularity of the profile, feedback from a user (e.g., a manual action to update a classification, as described herein), etc. Granularity may also be used to break a tie between multiple profiles with the more granular classification result preferred or selected. For example, if an entity matches a vendor profile (e.g., manufacturer) and vendor/model profile (e.g., manufacturer switch model 2900), the vendor/model profile will be selected for the classification result.

Embodiments advantageously include a hybrid architecture to leverage advantages of both local and cloud based classification resources. The improvements in classification enhance entity visibility throughout environments, networks, etc. Embodiments thereby over the shortcomings of a pure cloud based solution which is not scalable due classification and communication delays. Embodiments further overcome the shortcomings of a pure local classification that is not scalable due to limitations of local resources (e.g., storage, processing, etc.). The use of dual classification engines enables achieving the advantages of both the cloud and the local classification resources. In addition, embodiments may provide classifications faster than use of a pure local classification or pure cloud classification separately. This can be in part due to tailoring the classification process to the unique resources available locally and in the cloud.

Embodiments further reduce the dependency on local infrastructure while making local classification more flexible and light weight. In some embodiments, this is achieved by selectively loading useful profiles (e.g., most popular profiles, profiles associated with verticals, and profiles associated with selected profile packages, some of which may be selected by a user) and having the full profile database in the cloud to reduce resource needs of the local classification engine and overhead of the classification engine. Embodiments thus enable the use of cloud computation and storage resources to enhance classification performance (e.g., both locally and in the cloud). Embodiments advantageously encode and encrypt the data uploaded to the cloud to keep data integrity while still providing data privacy and reducing bandwidth consumption.

Embodiments are able to more effectively deal with unknown devices based use of proximity matching, machine learning matching, or other technique in the cloud. The use of these techniques for matching leverages the data in the cloud that is shared from multiple networks, as described herein.

Embodiments further shorten the delay of using profile updates due to a periodic profile update release window. The availability of the updated profiles in cloud means that the benefits of the updated profile can be used for classifications substantially immediately as the profiles are added to the cloud profile data store.

Embodiments further leverage user feedback to adjust the confidence of one or more profiles in an automatic manner (e.g., without user involvement or action to adjust the confidence associated with one or more profiles), which allow updates to confidence scores rapidly thereby enhancing classification on a global level. In some embodiments, the cloud classification engine is available via a subscription as a service (e.g., with a paid license).

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

An entity or entities, as discussed herein, may include devices (e.g., computer systems, for instance laptops, desktops, servers, mobile devices, IoT devices, OT devices, healthcare devices, financial devices, etc.), network devices or infrastructure (e.g., firewall, switch, access point, router, enforcement point, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the entity, an entity may have an IP address (e.g., a device) or may be without an IP address (e.g., a serverless service).

Enforcement points including firewalls, routers, switches, cloud infrastructure, other network devices, etc., may be used to enforce segmentation or other security policies on a network (and different address subnets may be used for each segment) and restricting communications between one or more network portions. Enforcement points may enforce segmentation by filtering or dropping packets according to the network segmentation policies/rules.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

Operational Technology (OT) can include devices from a wide variety of industries, including, but not limited to, medical systems, electrical systems (e.g., power generation, power distribution, and other power utility devices and infrastructure), oil and gas plants, mining facilities, manufacturing systems, water distribution systems, chemical industry systems, pharmaceutical systems, infrastructure systems (e.g., used with roads, railways, tunnels, bridges, dams and buildings), and other industrial control systems.

Accordingly, described herein in various implementations are systems, methods, techniques, and related technologies, which enable improved classification. Advantageously, embodiments are configured for improving classification by using local and cloud based classification. The local classification is configured to use less resources and leverage the benefits of the cloud resources. Embodiments thus enable improved and more efficient classification with more efficient resource usage.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122*a-b*. The devices 120 and 130 and network coupled devices 122*a-b* may be any of a variety of devices or entities including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122*a-b*. Network device 104 may be one or more network switches, access points, routers, firewalls, hubs, etc.

Network device 104 is further configured to communicatively couple network 100 and network 160. Network 100 and network 160 may be communicatively coupled via one or more networks including the Internet.

Network 160 may be a remote network relative to network 100. The term remote network as used herein can include a cloud network or cloud computing network, a network at another or different location (e.g., campus or branch office), or a different network segment (e.g., different IP address range possibly associated with a management device as described herein). Network 160 includes classification system 162. Classification system 162 is can perform cloud based classification (e.g., using a cloud based classification engine) in conjunction with classification performed by network monitor device 102 to achieve better classification, as described herein. Classification system 162 further can aggregate the popularity of profiles, determine a classification based on a proximity match, machine learning, or other techniques, as described herein. Classification system 162 may further adjust the confidence associated with one or more profiles based on a manual classification or reclassification, as described herein. Classification system 162 may determine one or more profiles (e.g., based on popularity, confidence, etc.) that are to be part of a profile library that can be used for local classification, as described herein.

Network monitor device 102 may be operable for a variety of tasks including performing classification of entities of network 100, communicating data associated with an entity (e.g., encoded and encrypted) with a cloud based classification resource or engine, receiving a classification from the cloud resource, storing the classification and taking action based on the classification, as described herein. Network monitor device 102 may determine a popularity for each profile locally, communicate popularity data to the cloud resource, and communicate information associated with manual classification changes to the cloud to enable adjustment of one or more confidence scores associated with one or more profiles, as described herein.

Network monitor device 102 may provide an interface (e.g., a command line interface (CLI) or graphical user interface (GUI)) for viewing and monitoring classification along with the ability to select a vertical and profile packages to be used for classification (e.g., locally and in the cloud), manually reclassify an entity, and adjust confidence and granularity thresholds. Network monitor device 102 thereby is able to provide details of the current state of classification, allow customization of the classification process (e.g., via confidence and granularity thresholds), and optimization based on vertical and selected profile packages, as described herein.

Network monitor device 102 may further perform a variety of operations including identification, classification, and taking one or more remediation actions (e.g., changing network access of an entity, changing the virtual local area network (VLAN), sending an email, sending a short message service (SMS) message, active actions, passive actions, etc.), as described herein.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be an enforcement point including, but not limited to, a router, firewall, switch, hypervisor, software-defined networking (SDN) controller, virtual firewall, a next generation firewall (NGFW), cloud infrastructure, or other network device or infrastructure device.

Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), proprietary protocols, etc.).

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an API, CLI, web interface, SNMP, etc.), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or $3^{rd}$ party systems (e.g., system 150) may further be used for determining one or more tags or characteristics for an entity. For example, a vulnerability assessment (VA) system may be queried to verify or check if an entity is in compliance and provide that information to network monitor device 102. External or $3^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices 122a-b. System 150 may include a vulnerability assessment (VA) system, a threat detection (TD) system, endpoint management system, a mobile device management (MDM) system, a firewall (FW) system, a switch system, an access point system, etc. Network monitor device 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of an entity being monitored in realtime which can then be used to determine a risk level of the entity.

Aggregation device 106 may be configured to communicate with network coupled devices 122a-b and provide network access to network coupled devices 122a-b. Aggregation device 106 may further be configured to provide information (e.g., operating system, entity software information, entity software versions, entity names, application present, running, or both, vulnerabilities, patch level, etc.) to network monitor device 102 about the network coupled devices 122a-b. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor device 102. It is appreciated that log information may be particularly reliable for stable network environments (e.g., where the types of devices on the network do not change often). The log information may include information of updates of software of network coupled devices 122a-b.

Figure 2:
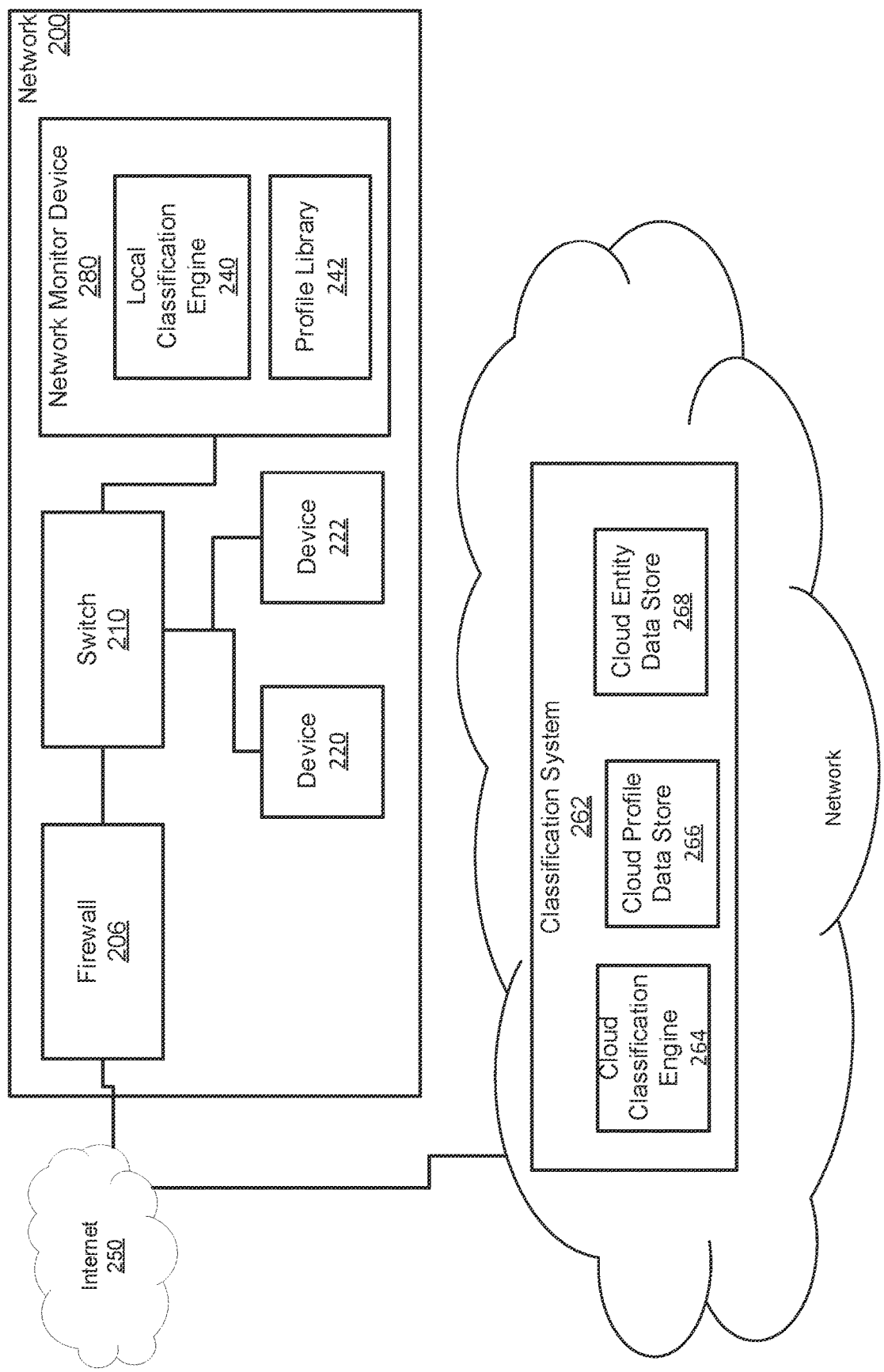
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewall 206 and switch 210) and a network monitor device 280 (e.g., network monitor device 102) which can perform classification, as described herein, associated with the various entities communicatively coupled in example network 200. Example components are shown of network monitor device 280 and classification system 262 and other components may be present or included, as described herein. Classification system 262 may be a cloud classification system as described herein. In some embodiments, classification system 262 may be part of a larger system operable to perform a variety of functions, e.g., part of a cloud based network monitor entity, security entity, etc.

FIG. 2 shows example devices 220-222 (e.g., devices 106, 122a-b, 120, and 130, other physical or virtual devices, other entities, etc.) and it is appreciated that more or fewer network devices or other entities may be used in place of the devices of FIG. 2. Example devices 220-222 may be any of a variety of devices or entities (e.g., OT devices, IoT devices, IT devices, etc.), as described herein. Enforcement points including firewall 206 and switch 210 may be any entity (e.g., network device 104, cloud infrastructure, etc.) that is operable to allow traffic to pass, drop packets, restrict traffic, etc. Network monitor device 280 may be any of a variety of network devices or entities, e.g., router, firewall, an access point, network access control (NAC) device, intrusion prevention system (IPS), intrusion detection system (IDS), deception device, cloud-based device or entity, virtual machine based system, etc. Network monitor device 280 may be substantially similar to network monitor device 102. Embodiments support IPv4, IPv6, and other addressing schemes. In some embodiments, network monitor device 280 may be communicatively coupled with firewall 206 and switch 210 through additional individual connections (e.g., to receive or monitor network traffic through firewall 206 and switch 210).

Switch 210 communicatively couples the various devices of network 200 including firewall 206, network monitor device 280, and devices 220-222. Firewall 206 may perform network address translation (NAT). Firewall 206 communicatively couples network 200 to Internet 250 and firewall 206 may restrict or allow access to Internet 250 based on particular rules or ACLs configured on firewall 206. Firewall 206 and switch 210 are enforcement points, as described herein.

Network monitor device 280 can access network traffic from network 200 (e.g., via port mirroring or SPAN ports of firewall 206 and switch 210 or other methods). Network monitor device 280 can perform passive scanning of network traffic by observing and accessing portions of packets from the network traffic of network 200. Network monitor device 280 may perform an active scan of an entity of network 200 by sending one or more requests to the entity of network 200. The information from passive and active scans of entities of network 200 can be used to classify the entities of network 200 and that information from the passive and active scan may be communicated to classification system 262 for further classification upon meeting a condition, as described herein. In some embodiments, classification system 262 may enhance classification that is limited to active scans not being available in an environment (e.g., an environment with entities that are sensitive to active scanning). The classification of an entity by network monitor device 280 using classification system 262 thereby allows for improved classification.

Network monitor device 280 includes local classification engine 240 which may perform classification of the entities of network 200 including firewall 206, switch 210, and devices 220-222. Network monitor device 280 further includes profile library 242 which includes profiles and may be customized based on user input (e.g., vertical and one or more profile packages) and popularity, as described herein.

Local classification engine 240 performs classification of the entities of network 200 using profile library 242.

As described herein, local classification engine 240 can send data about the entities of network 200, as determined by local classification engine 240, to classification system 262. For classifications meeting a condition of being under a threshold (e.g., confidence threshold, granularity threshold or a combination thereof) or being unknown, network monitor device 280 can encode and communicate data about an entity meeting the condition to the classification system 262. Classification system 262 can then perform a cloud based classification (e.g., based on profile matching, proximity matching, machine learning, etc.), as described herein. Cloud classification system 262 can then send a classification result based on the cloud classification to network monitor device 280.

Local classification engine 240 may encode and encrypt the information prior to sending the data to classification system 262. In some embodiments, local classification engine 240 checks the confidence and granularity of each classification result and communicates with classification system 262 data to perform a classification where at least one of a granularity threshold or a confidence threshold are not met. Local classification engine 240 may receive a classification result from classification system 262 and use that classification to perform various security related measures.

In some embodiments, local classification engine 240 may check with classification system 262 to determine if a matched profile is the latest available profile. Local classification engine 240 may further check if a manual classification or reclassification of an entity has been input and send relevant data to cloud system 262, as described herein.

Classification system 262 can perform a cloud based classification, as described herein. In some embodiments, classification system 262 includes cloud classification engine 264, cloud profile data store 266, and cloud entity data store 268.

Cloud classification engine 264 may perform classification based on data received from network monitor device 280, as described herein. Cloud classification engine 264 may unencrypt and decode the information received prior to performing a classification, as described herein. Cloud classification engine 264 may resolve a classification conflict if multiple profiles are matched, perform a check of a classification against a confidence threshold, perform a check of a classification against a granularity threshold, and perform classification based on a proximity matching, machine learning matching, or other techniques, as described herein. Cloud classification engine 264 may use cloud profile data store 266 and cloud entity data store 268 in determining a classification. A classification determined by cloud classification engine 264 can be sent back to network monitor device 280.

Cloud profile data store 266 is profile data store (e.g., a cloud profile database) with each profile available (e.g., including the less popular profiles), as described herein. For example, data stored in cloud profile data store 266 may include entity or device name, operating system, function, vendor/model, fingerprint, confidence score, popularity score, data added, and last update date. Cloud profile data store 266 is not subject to the resource conditions or limitations (e.g., processing power, storage, etc.) that may impact network monitor device 280 (e.g., and local classification engine 240). Cloud entity data store 268 is a data store (e.g., a cloud entity database) of entity information that has been uploaded to classification system 262, as described herein. For example, data in cloud entity datastore 268 may include entity or device name, operating system, function, vendor/model, and host information.

With reference to FIGS. 3-6, flowcharts 300-600 illustrate example operations used by various embodiments. Although specific operation blocks ("blocks") are disclosed in flowcharts 300-600, such blocks are examples. That is, embodiments are well suited to performing various other blocks or variations of the blocks recited in flowcharts 300-600. It is appreciated that the blocks in flowcharts 300-600 may be performed in an order different than presented, and that not all of the blocks in flowcharts 300-600 may be performed.

Figure 3:
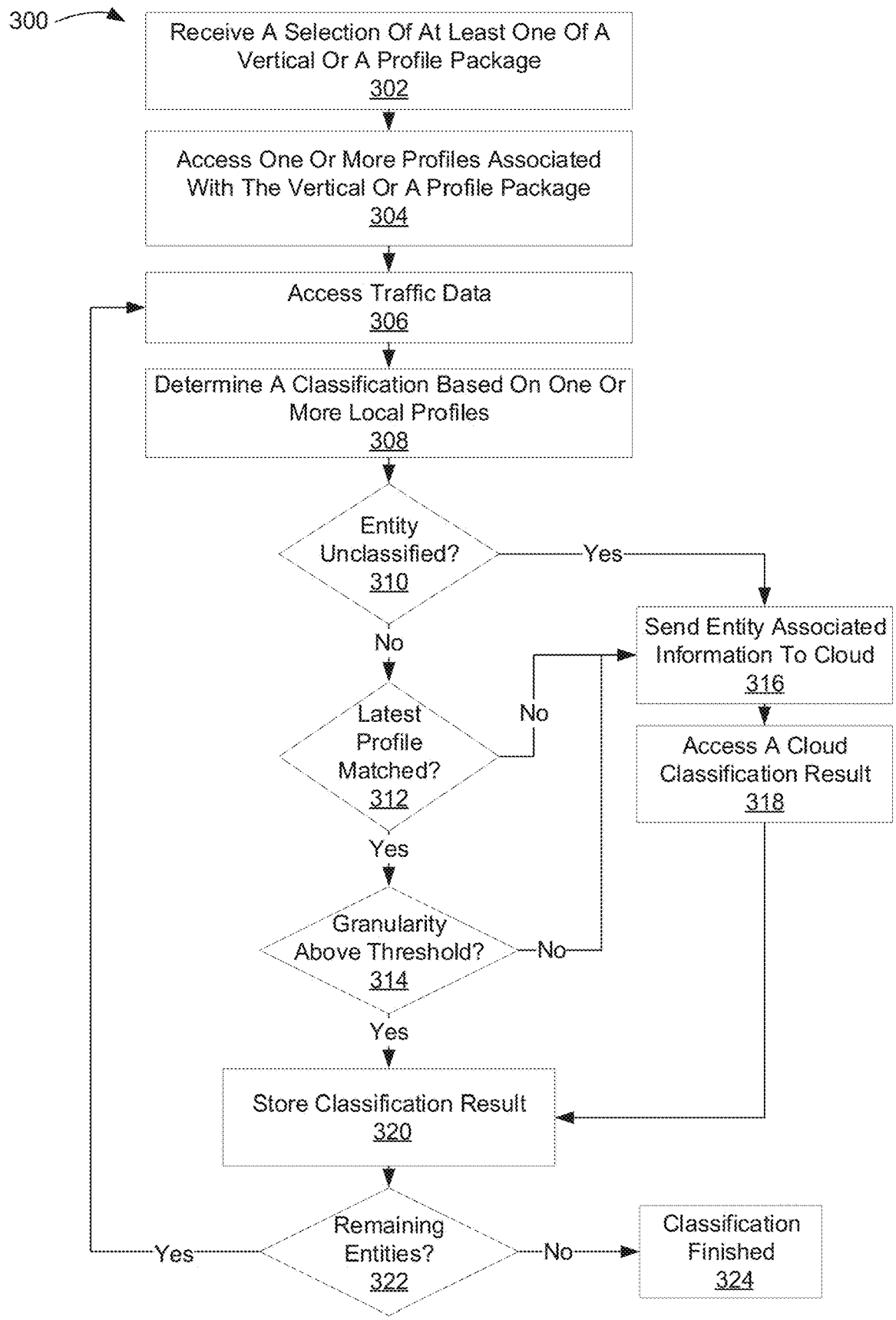
FIG. 3 depicts a flow diagram of aspects of a method for classification using multiple resources in accordance with one implementation of the present disclosure.

FIG. 3 depicts a flow diagram of aspects of a method for classification using multiple resources in accordance with one implementation of the present disclosure. Various portions of flowchart 300 may be performed by different components (e.g., components of system 700) of an entity (e.g., network monitor device 102 or network monitor device 280). Flowchart 300 depicts a process for performing a local classification and based on a classification meeting a condition, communicating with another classification system (e.g., a cloud classification system 262) to receive another classification result, and storing the classification result. After the classification process of flow chart 300 one or more actions may be optionally performed (e.g., changing a network configuration, sending or presenting a notification, etc.), as described herein. Flowchart 300 may be performed during an initial classification.

At block 302, a selection of at least one of a vertical (industry) or a profile package is optionally received. The vertical may be selected by a user and one or more profile packages may be selected by a user, as described herein. For example, a financial services user could select a financial services vertical and a general IT profile package. The one or more profile packages may also be based on specific environments, e.g., radiology, operating room, reception/check-in area, etc.

At block 304, one or more profiles associated with the vertical or a profile package are accessed. The profiles associated with the vertical or profile packages may be loaded into memory to be used for classification. The profile package can be based on a various of entities, e.g., a healthcare profile package, a general IT profile package, an industrial OT profile package, as described herein. In some embodiments, there may be substantially at least one profile package associated with each vertical.

In some embodiments, environment data and other user associated data is accessed. The data accessed may include environment (e.g., branch, data center, campus, etc.) and one or more selected (e.g., by a user) segments or network portions where classification is to be performed. In some embodiments, various information (e.g., vertical, common type of devices for the network or network portions, segments, areas with classification issues, etc.) may be obtained from a user (e.g., based on user entry, for instance, in response to a prompt to provide the information).

At block 306, traffic data is accessed. The traffic may be accessed by a network monitoring entity (e.g., network monitoring devices 102 or 280) via a port mirroring or SPAN port or via another method, as described herein. The traffic data may include one or more properties for each entity communicatively coupled to one or more networks and the one or more properties extracted from the traffic data. The traffic may include active scanning properties (e.g., if active scanning is enabled).

In some embodiments, data is further accessed from third party systems (e.g., system 150, an external system, etc.) and used along with traffic data. The data from third party systems may be accessed from the third party systems via a plugin or module of the network monitoring entity. For example, this data could be accessed from a variety of systems including, but not limited to, a vulnerability assessment (VA) system, a threat detection (TD) system, endpoint management system, a mobile device management (MDM) system, a firewall (FW) system, a switch system, an access point system, a WMI script, network infrastructure, an entity itself, etc.

At block 308, a classification based on one or more local profiles is determined. The classification may be determined using the local profiles. This may be determined based on a matching of properties associated with an entity with the local profiles to determine a classification result based on a match of the properties associated with the entity to a profile. The classification result may have an associated confidence score (e.g., based on the profile matched). The classification result can be checked against a confidence threshold, a granularity threshold, etc., as described herein. The classification can be determined using the traffic data (e.g., from a passive scan or observation), data from the entity itself (e.g., from an active scan), data from third party systems, etc.

In some embodiments, if information or properties associated with active scanning are unavailable, a user may be directed to a portion of a graphical user interface to enable active scanning. It is appreciated that certain environments (e.g., healthcare, OT, manufacturing, etc.) may be sensitive to active scanning and as such active scanning may be limited or not be an option.

At block 310, whether the entity is unclassified is determined. If the classification result is unknown, the entity may be determined to be unclassified. If the entity is unclassified, block 316 may be performed. In some embodiments, block 316 may be performed if the classification result is below a confidence threshold, or a granularity threshold. If the entity is classified, block 312 may be performed.

At block 312, whether the latest profile (available) was matched (e.g., as part of the classification) is determined. This may be determined by checking a profile date with a cloud classification system (e.g., cloud classification system 162 or 262). If the latest profile is matched, block 314 is performed. If the latest profile was not matched, block 316 is performed.

At block 314, whether the classification is above a granularity threshold is determined. If the classification is above a granularity threshold, block 320 is performed. If the classification is not above a granularity threshold, block 316 is performed. In some embodiments, the granularity threshold may be user configurable, have a default value, etc.

At block 316, entity associated information is sent to the cloud. As described herein, data associated with the entity can be encrypted and encoded prior to sending to the cloud.

At block 318, a cloud classification result is accessed. The cloud classification result may be determined by a cloud based resource (e.g., classification system 162 or 262 performing process 400) based on the information associated with the entity that is sent, as described herein. The cloud classification result may be accessed in association with a push or pull communication to the cloud based resource, as described herein.

At block 320, a classification result is stored. The classification result may be stored in a data store (e.g., database) locally that is used by a network monitor device to perform various security actions, as described herein. For example, the classification result may be stored and then used for performing policy associated actions, as described herein.

At block 322, whether there are any remaining entities to be classified is determined. If there are remaining entities to be classified, block 306 may be performed. If there are not remaining entities to be classified, block 324 may be performed.

At block 324, classification is finished. In some embodiments, classification of each entity may be performed again, e.g., on a periodic, prompt (e.g., user prompted basis), a schedule, cloud service based schedule, or based on a policy, to maintain up to date classifications.

Figure 4:
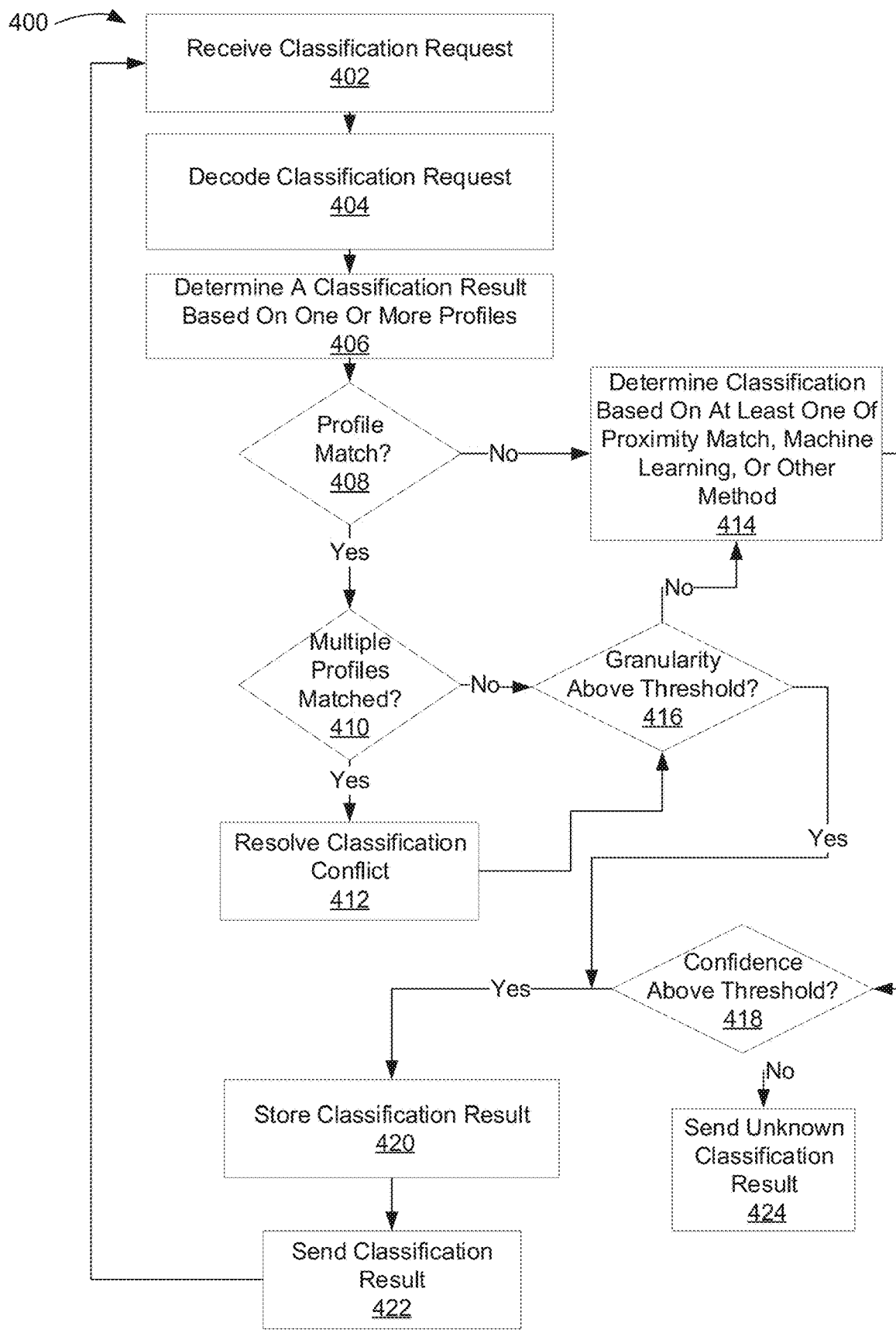
FIG. 4 depicts a flow diagram of aspects of a method for performing classification with a cloud associated resource in accordance with one implementation of the present disclosure.

FIG. 4 depicts a flow diagram of aspects of a method for performing classification with a cloud associated resource in accordance with one implementation of the present disclosure. Various portions of flowchart 400 may be performed by different components (e.g., components of system 700) of an entity (e.g., classification systems 162 or 262). Flowchart 400 depicts a process for performing a cloud based classification, checking whether a classification result meets a condition (e.g., matches multiple profiles, meets a granularity threshold, meets a confidence threshold), communicating the classification to a local classification system (e.g., local classification engine 240 of network monitor 280), and storing the classification result, as described herein. Flowchart 400 may be performed as part an initial classification (e.g., based on one or more requests based on a local classification).

At block 402, a classification request is received. The classification request may include data values associated with properties associated with an entity, may be encoded (e.g., in a fixed length data structure or format), and may be encrypted, as described herein.

At block 404, the classification request data is decoded. The classification request can be decrypted prior to being decoded, as described herein. In some embodiments, the classification request data may be translated into property and value pairs.

At block 406, a classification result based on one or more profiles is determined. The classification may be determined using the profiles of the cloud. This may be determined based on a matching of properties associated with an entity with the cloud profiles to determine a classification result based on a match of the properties associated with the entity to a profile. The classification result may have an associated confidence score (e.g., based on the profile matched). The classification result can be checked against a confidence threshold, a granularity threshold, etc., as described herein. The classification can be determined using the data from the classification request to match to a profile, as described herein.

At block 408, whether a profile was matched based on the classification is determined. If a profile was matched, block 410 may be performed. If a profile was not matched, block 414 may be performed.

At block 410, whether multiple profiles are matched is determined. If multiple profiles were matched, block 412 may be performed. If multiple profiles were not matched, block 416 may be performed.

At block 412, the classification conflict (e.g., among the multiple profiles) is resolved. The classification conflict may be resolved based on confidence scores associated with each of the multiple profiles including confidence scores adjusted based on user feedback, as described herein. In some embodiments, in the case of multiple classifications, one or more missing properties may be determined, if any, and a user may be prompted to perform a manual classification (e.g., via communication with a network monitor entity).

At block 414, a classification based on at least one of a proximity match, machine learning match, or other method is determined, as described herein. The classification result based on the proximity match, machine learning match, or other method may be a similarity based classification, as described herein.

At block 416, whether a granularity of the classification is above a granularity threshold is determined. If the granularity of the classification is above a granularity threshold, block 420 may be performed. If the granularity of the classification is not above a granularity threshold, block 414 may be performed.

At block 418, whether the confidence of the classification is above a confidence threshold is determined. If the confidence of the classification is above a confidence threshold, block 420 may be performed. If the confidence of the classification is not above a confidence threshold, block 424 may be performed. In some embodiments, the confidence threshold may be user configurable.

At block 420, the classification result is stored. The classification result may be stored in a data store within the cloud. In some embodiments, the classification result may be stored in a data store within the cloud (e.g., cloud entity data store 268) that is used for similarity based matches (e.g., proximity matching, machine learning matching, etc.).

At block 422, the classification result is sent. The classification result may be sent from a cloud based classification resource or engine to a local entity performing network monitoring (e.g., network monitor device 102 or 280).

Figure 5:
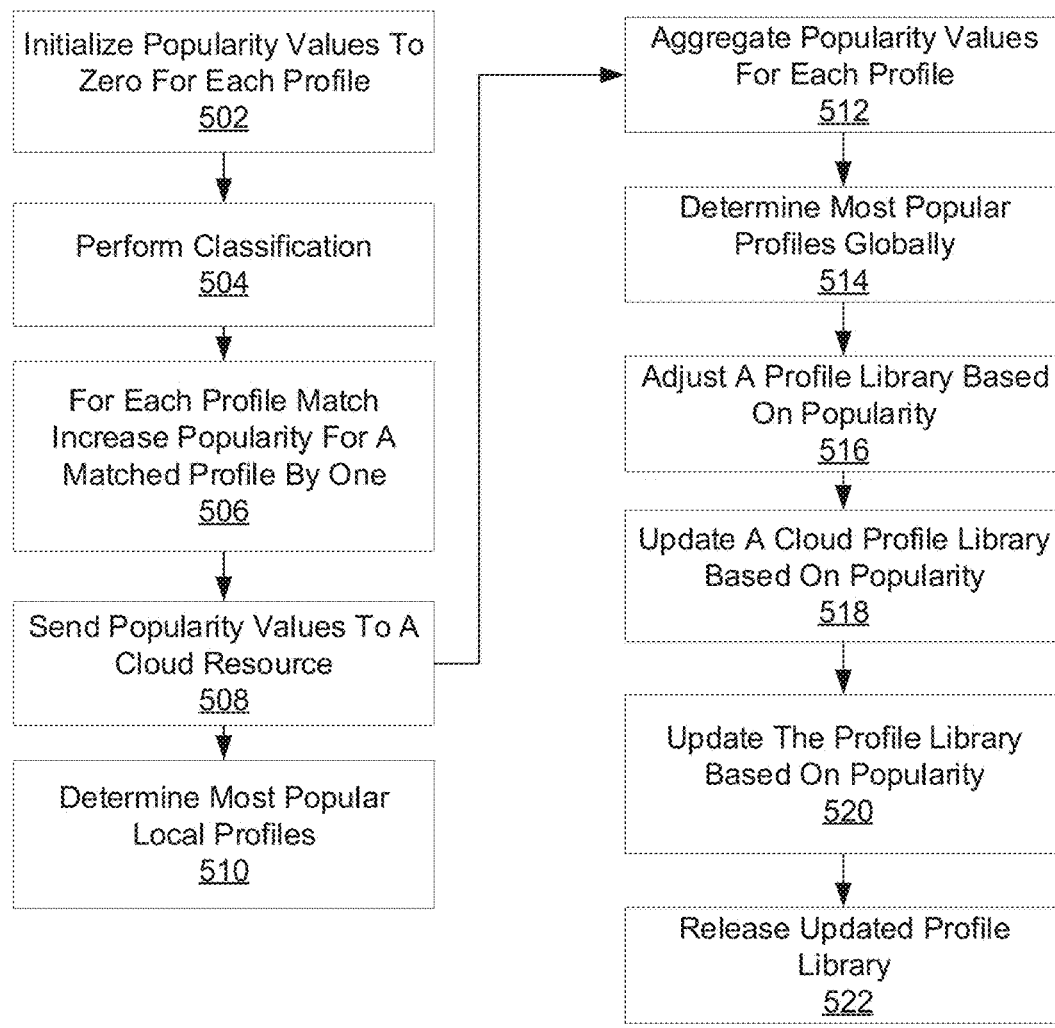
FIG. 5 depicts a flow diagram of aspects of a method for determining popularity associated with a profile in accordance with one implementation of the present disclosure.

FIG. 5 depicts a flow diagram of aspects of a method for determining popularity associated with a profile in accordance with one implementation of the present disclosure. Various portions of flowchart 500 may be performed by different components (e.g., components of system 700) of an entity (e.g., network monitor device 102 or network monitor device 280). Flowchart 500 depicts a process for determining popularity values associated with each profile locally, communicating the popularity values to a cloud based resource, aggregation of the popularity values of each profile, and adjusting profile libraries (e.g., a profile library for local classification and cloud profile library), as described herein. Flowchart 500 may be performed after or as part an initial classification (e.g., shown in flowchart 300).

In some embodiments, the popularity values from a local network may not be needed as information for the entities that have data that has previously been uploaded to a cloud entity data store (e.g., cloud entity data store 268), as described herein. For networks or network monitor entities that have not uploaded such data, the initial popularity values may be determined locally and uploaded (e.g., as described with respect to flowchart 500).

At block 502, popularity values are initialized to zero for each profile. Embodiments may support other initial popularity values.

At block 504, a classification of entities is performed. The classification of the entities may be performed using processes 300 and 400, as described herein.

At block 506, for each profile match (e.g., classification) the associated popularity value is increased for each profile matched (e.g., locally). Embodiments may support increasing the popularity values by incrementing by an integer of one or more or other value or number.

At block 508, popularity values are sent to a cloud resource. The popularity values for each profile may be sent to a cloud resource (e.g., classification system 162 or 262) by network monitor entities of multiple different networks.

At block 510, most popular local profiles are determined (e.g., by a network monitor entity). The most popular local profiles may be determined based on ranking the profiles by associated popularity value and storing the popularity information. This popularity information may be updated as each new entity is classified.

At block 512, popularity values for each profile are aggregated. The profiles in the cloud may be associated with popularity values initialized with an initial value of zero and incremented or increased based the number of matches associated with each profile uploaded. For networks or associated network monitor entities that already have uploaded entity information (e.g., as stored in cloud entity data store 268), the cloud entity data store and matched profiles may be used to set the initial popularity values in the cloud and remove the need for the upload popularity information for these networks.

At block 514, the most popular profiles globally are determined. The most popular profiles may be determined based on ranking the profiles by associated popularity value and storing the popularity information. This popularity information may be updated as each new entity is classified.

At block 516, a profile library is adjusted based on popularity. The profile library operable to be used for local classification can be adjusted to include the most popular profiles and less popular profiles disabled or removed. For example, the profile library may be adjusted to include the 2,000 most popular profiles. In some embodiments, profile packages may also be adjusted based on popularity.

At block 518, a cloud profile library is updated based on popularity. The cloud profile library can be adjusted based on popularity (e.g., global popularity) and then used for cloud classifications.

At block 520, the profile library is updated based on popularity. The updating of the profile library may be updating a copy of the profile library that will be available for download. This could include encoding, encrypting, compressing, etc., the profile library.

At block 522, the updated profile library is released. The updated profile library may be released by sending a notification, sending the profile library, or making the updated profile library available for download.

Figure 6:
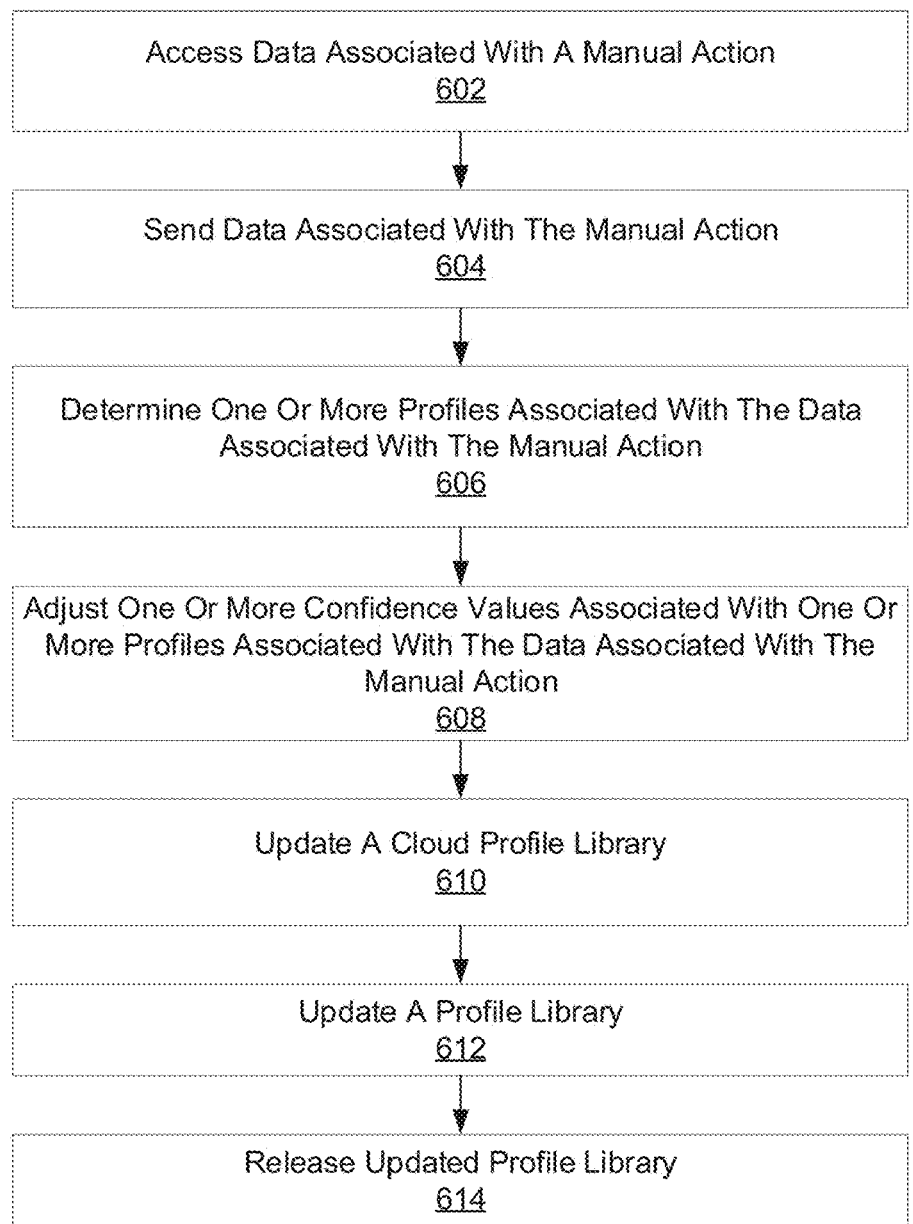
FIG. 6 depicts a flow diagram of aspects of a method for adjusting confidence associated with one or more profiles in accordance with one implementation of the present disclosure.

FIG. 6 depicts a flow diagram of aspects of a method for adjusting confidence associated with one or more profiles in accordance with one implementation of the present disclosure. Various portions of flowchart 600 may be performed by different components (e.g., components of system 700) of an entity (e.g., network monitor device 102 or network monitor device 280) or a cloud resource (e.g., classification system 262). Flowchart 600 depicts a process for adjusting one or more confidence scores associated with one or more profiles based on a manual action (e.g., user action) or reclassification, as described herein. Flowchart 600 may be performed after an initial classification. In some embodiments, one or more blocks of flowchart 600 may be performed in the cloud. The blocks of flowchart 600 may also be triggered on a local basis (e.g., by a network monitor entity, such as network monitor devices 102 and 280) by a manual reclassification or manual action to adjust a classification.

At block 602, data associated with a manual action is accessed. The data associated with the manual action can accessed by a network monitor entity (e.g., network monitor devices 102 or 280). The data associated with the manual action can include data associated with the entity (e.g., properties and values), a profile matched during classification of the entity, and data associated with a manual action including a reclassification of the entity (e.g., by a user).

At block 604, data associated with the manual action is sent. The data associated with the manual action may be encrypted and encoded prior to being sent, as described herein. The data associated with the manual action can be sent or uploaded by network monitor entity (e.g., network monitor device 102 or 280) to a cloud resource (e.g., classification system 162 or 262).

At block 606, one or more profiles associated with the data associated with the manual action are determined. The cloud resource determines one or more profiles associated the manual action which may include the profile associated with the classification result (e.g., prior to the manual action) and a profile associated with the manual input of the manual action.

At block 608, one or more confidence values associated with the one or more profiles associated with the data associated with the manual action are adjusted. For example, if 1,000 classification results based on a profile A were adjusted by manual action to profile B or the classification result associated with profile B, the confidence associated with profile A based on the properties associated with those 1,000 entities may be reduced while the confidence associated with profile B based on the properties associated with those 1,000 entities may be increased.

At block 610, a cloud profile library is updated. The cloud profile library can be adjusted by modifying the confidence scores of the profiles of cloud profile library associated with the manual action.

At block 612, a profile library is updated. The updating of the profile library may include modifying the confidence scores of the profiles of profile library (e.g., for local classification) associated with the manual action and the classification prior to the manual action. This could further include encoding, encrypting, compressing, etc., the profile library.

At block 614, an updated profile library is released. The updated profile library may be released by sending a notification, sending the profile library, or making the updated profile library available for download.

Figure 7:
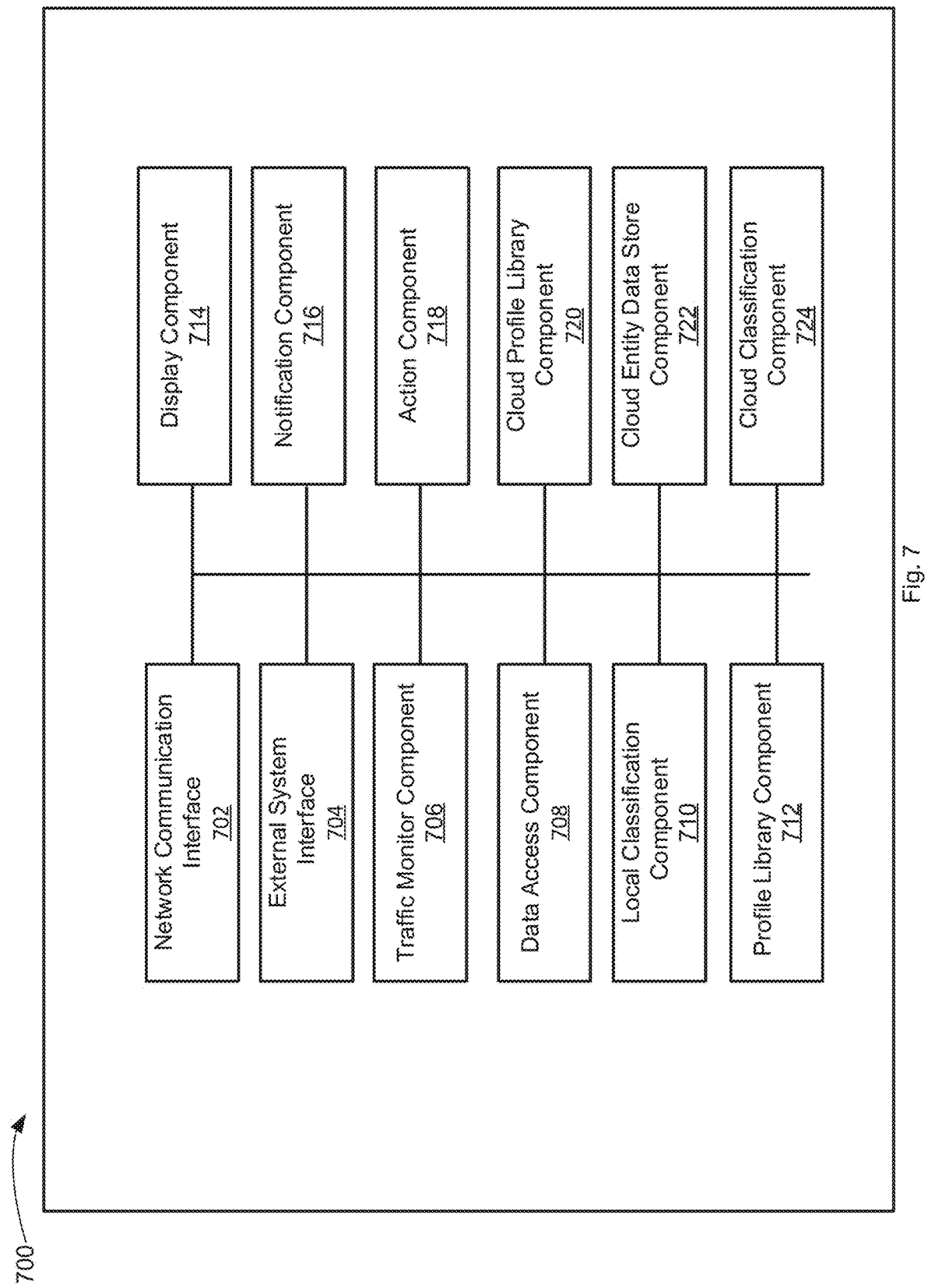
FIG. 7 depicts illustrative components of a system for determining a classification in accordance with one implementation of the present disclosure.

FIG. 7 illustrates example components used by various embodiments. Although specific components are disclosed in system 700, it should be appreciated that such components are examples. That is, embodiments are well suited to having various other components or variations of the components recited in system 700. It is appreciated that the components in system 700 may operate with other components than those presented, and that not all of the components of system 700 may be required to achieve the goals of system 700.

FIG. 7 depicts illustrative components of a system for determining a classification in accordance with one implementation of the present disclosure. Example system 700 or classifier 700 includes a network communication interface 702, an external system interface 704, a traffic monitor component 706, a data access component 708, a local classification component 710, a profile library component 712, a display component 714, a notification component 716, an action component 718, a cloud profile library component 720, a cloud entity data store component 722, and a cloud classification component 724. The components of system 700 may be part of a computing system, other electronic device, or entity (e.g., network monitor device 102 or network monitor device 280) or a virtual machine or device and be operable to monitor one or more entities communicatively coupled to a network, monitor network traffic, and classify the one or more entities, as described herein. For example, the system 700 may further include a memory and a processing device, operatively coupled to the memory, which may perform the operations of or execute the components of system 700. The components of system 700 may access various data and characteristics or properties associated with an entity (e.g., network communication information or traffic), data associated with one or more entities (e.g., from network devices, local resources, cloud resources, external systems, for instance system 150), etc., as described herein. It is appreciated that the modular nature of system 700 may allow the components to be independent and allow flexibility to enable or disable individual components or to extend, upgrade, or combination thereof components without affecting other components thereby providing scalability and extensibility. System 700 may perform one or more blocks of flow diagrams 300-600. The components of system 700 may be part of a network monitor entity (e.g., network monitor devices 102 or 280) or part of a cloud based system (e.g., classification system 162 or classification system 262).

Communication interface 702 is operable to communicate with one or more entities (e.g., network device 104, firewall 206, switch 210, other devices coupled thereto, devices 220-222, etc.) coupled to a network that are coupled to system 700 and receive or access information about entities (e.g., device information, device communications, device characteristics, properties, etc.), access information as part of a passive scan, send one or more requests as part of an active scan, receive active scan results or responses (e.g., responses to requests), as described herein. The communication interface 702 may be operable to work with one or more components to initiate access to characteristics or determination of characteristics of an entity to allow determination of one or more properties which may then be used for device compliance, asset management, standards compliance, classification, identification, etc., as described herein. Communication interface 702 may be used to receive and store network traffic for determining properties, as described herein.

External system interface 704 is operable to communicate with one or more third party, remote, or external systems to access information including characteristics or attributes associated with an entity, which may be used for classification. External system interface 704 may further store the accessed information in a data store. For example, external system interface 704 may access information from a vulnerability assessment (VA) system to enable determination of one or more compliance or risk characteristics associated with the entity. External system interface 704 may be operable to communicate with a vulnerability assessment (VA) system, an advanced threat detection (ATD) system, a mobile device management (MDM) system, a firewall (FW) system, a switch system, an access point (AP) system, etc. External system interface 704 may query a third party system using an API or CLI. For example, external system interface 704 may query a firewall or a switch for information (e.g., network session information) about an entity or for a list of entities (e.g., an ARP table) that are communicatively coupled to the firewall or switch and communications associated therewith. In some embodiments, external system interface 704 may query a switch, a firewall, or other system for information of communications or properties associated with an entity.

Traffic monitor component 706 is operable to monitor network traffic to determine if a new entity has joined the network or an entity has rejoined the network and monitor traffic for analysis by local classification component 710, profile library component 712, cloud profile library component 720, cloud entity data store component 722, and cloud classification component 724, among others, as described herein. Traffic monitor component 706 may have a packet engine operable to access packets of network traffic (e.g., passively) and analyze the network traffic. The traffic monitor component 706 may further be able to access and analyze traffic logs from one or more entities (e.g., network device 104, system 150, or aggregation device 106) or from an entity being monitored. The traffic monitor component 706 may further be able to access traffic analysis data associated with an entity being monitored, e.g., where the traffic analysis is performed by a third party system.

Data access component 708 is operable for accessing data including metadata associated with one or more network monitoring entities (e.g., network monitor devices 102 or 280-282), including properties that the network monitoring entity is monitoring or collecting, software versions (e.g., of the profile library of the network monitoring entity), and the internal configuration of the network monitoring entity. Data access component 708 may further access vertical or environment data and other user associated data, including vertical, environment, common type of devices for the network or network portions, segments, areas with classification issues, etc., as described herein.

Local classification component 710 is operable to perform a classification of entities one or more networks communicatively coupled to system 700, as described herein. The classification may be based on the profiles in profile library component 712, as described herein. For classifications meeting a condition of being under a threshold (e.g., confidence threshold, granularity threshold or a combination thereof) or unknown, local classification component 710 can encode, encrypt, and communicate data about an entity meeting the condition to the cloud classification component 724, as described here.

Profile library component 712 is operable to store profiles locally (e.g., for a network monitor entity) and be accessed by local classification component 710 to enable classification, as described herein. Profile library component 712 which may be customized based on user input (e.g., vertical and one or more profile packages) and based on popularity, as described herein. In some embodiments, profile library component 712 may be substantially similar to profile library 242, as described herein.

Display component 714 is configured to optionally display one or more graphical user interfaces (GUIs) or other interfaces (e.g., command line interface) for depicting various information associated with entities or devices, one or more checks to be performed, results of one or more checks, one or more recommendations, various classification related statistics, etc., as described herein. The GUIs or other interfaces may allow user selection of a vertical, one or more profile packages, and manual classification, as described herein.

Notification component 716 is operable to initiate one or more notifications based on the results of monitoring communications or attributes of one or more entities (e.g., alerting of an unknown classification, a low granularity classification, etc.), as described herein. The notification may be any of a variety of notifications, e.g., IT ticket, email, SMS, a HTTP notification, etc., as described herein.

Action component 718 is operable for initiating or triggering one or more remediation actions or security actions according to one or more policies, e.g., based on a classification of an entity, as described herein. Action component 718 may further be configured to perform other operations including checking compliance status, finding open ports, etc. Action component 718 may restrict network access, signal a patch system or service, signal an update system or service, etc., as described herein. The action component 718 may thus, among other things, invoke automatically patching, automatically updating, and automatically restrict network access of an entity (e.g., that has out-of-date software or based on access rule violation or attempted violation), automatic change of an entity to another network portion (e.g., VLAN), as described herein.

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

Cloud profile library component 720 is operable to store profile data of each profile available (e.g., including the less popular profiles), as described herein. Cloud profile library component 720 is not subject to the resource conditions or limitations (e.g., processing power, storage, etc.) that may impact a network monitor device entity (e.g., network monitor devices 102 or 280) associated classification components (local classification component 710 and profile library component 712), as described herein. In some embodiments, cloud profile library component 720 may be substantially similar to cloud profile library 266, as described herein. Cloud entity data store component 722 is operable to store entity information that has been uploaded from one or more networks (e.g., by one or more network monitor entities, for instance, network monitor devices 102 and 280), as described herein. In some embodiments, cloud entity data store component 722 may be substantially similar to cloud entity data store 268, as described herein.

Cloud classification component 724 is operable to perform a classification based on data received from local classification component 710, as described herein. Cloud classification component 724 may unencrypt and decode the information received prior to performing a classification, as described herein. Cloud classification component 724 may resolve classification conflict if multiple profiles are matched, perform a check of a classification against a confidence threshold, perform a check of a classification against a granularity threshold, and perform a classification based on a proximity match, machine learning match, or other techniques, as described herein. Cloud classification component 724 may use cloud profile library component 720 and cloud entity data store component 222 in determining a classification. A classification determined by cloud classification component 724 can be sent back to local classification component 710.

The system 700 may be software stored on a non-transitory computer readable medium having instructions encoded thereon that, when executed by a processing device, cause the processing device to access network traffic from a network and select an entity. The instructions may further cause the processing device to determine one or more values associated with one or more properties associated with the entity. The one or more values are accessed from the network traffic. The instructions may further cause the processing device to determine, by a processing device, a first classification result of the entity based on accessing one or more local profiles. The instructions may further cause the processing device to in response to the first classification result meeting a condition, send one or more values associated with one or more properties associated with the entity. The instructions may further cause the processing device to receive a second classification result, wherein the second classification result is determined based one accessing at least one remote profile. The instructions may further cause the processing device to store at least one of the first classification result or the second classification result.

In some embodiments, the condition comprises at least one of being unclassified, a confidence associated with the first classification result being below a confidence threshold, or a granularity associated with the first classification being below a granularity threshold. In various embodiments, the instructions may further cause the processing device to perform an action based on at least one of the first classification result or the second classification result. In some embodiments, the send comprises sending one or more values associated with one or more properties associated with the entity to at least one of a cloud resource or a cloud classification engine. In various embodiments, the instructions may further cause the processing device to in response to the first classification result being a classification of the entity, determining whether a profile associated with the first classification result is the latest profile available.

In some embodiments, the instructions may further cause the processing device to in response to the first classification result being a classification of the entity and the profile associated with the first classification result being the latest profile available, determining whether first classification result is above at least one of a granularity threshold or a confidence threshold. In various embodiments, the second classification result is based on at least one of a proximity based classification or a machine learning based classification. In some embodiments, the one or more local profiles comprise a plurality of profiles selected based on popularity. In various embodiments, the instructions may further cause the processing device to receive a selection of at least one of a vertical or a profile package and access the one or more profiles based on at least one of the vertical or the profile package. In some embodiments, the send of the one or more values associated with the entity further comprises encoding the one or more values associated with the entity.

Figure 8:
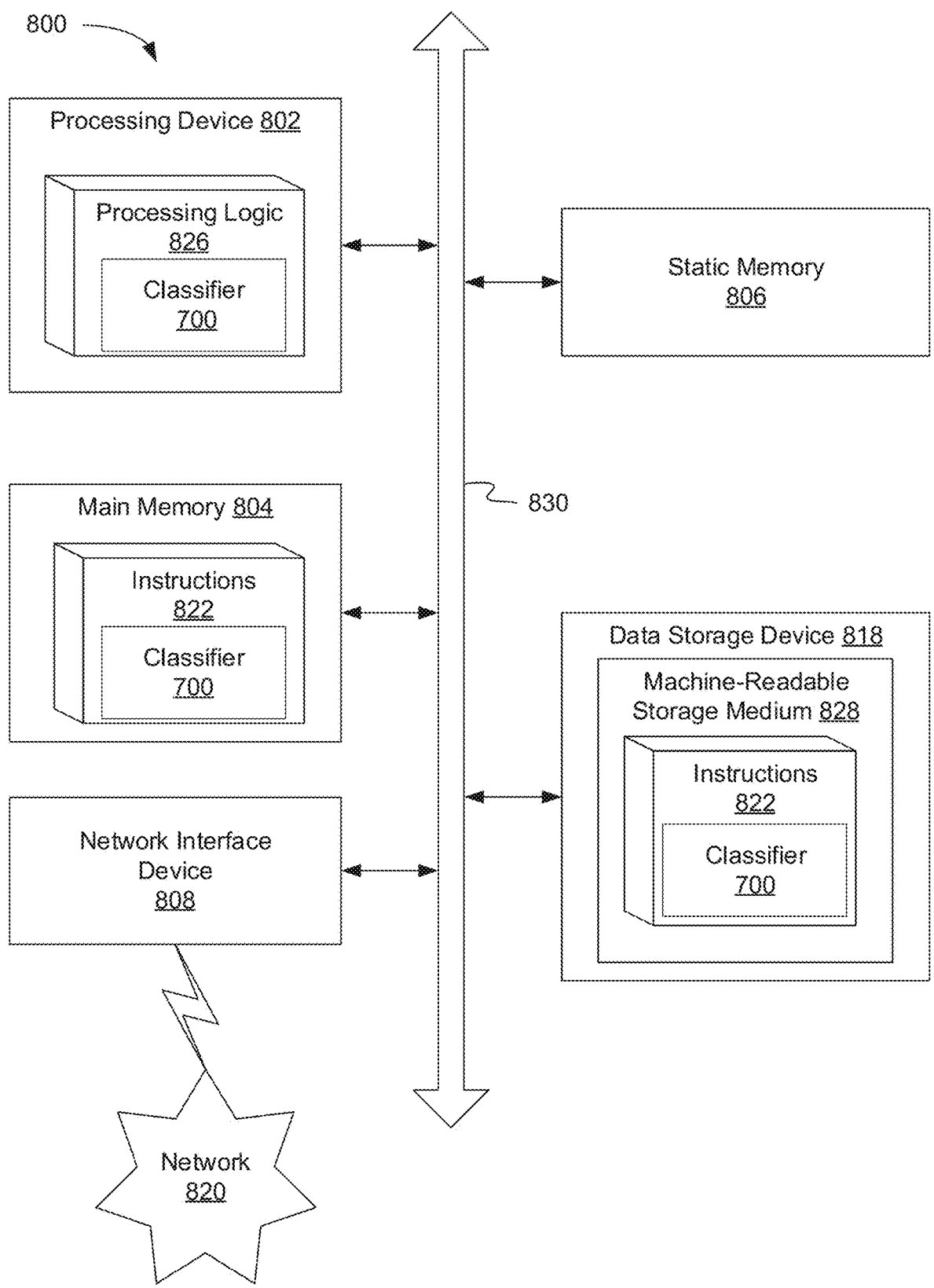
FIG. 8 is a block diagram illustrating an example computer system, in accordance with one implementation of the present disclosure.

FIG. 8 is a block diagram illustrating an example computer system, in accordance with one implementation of the present disclosure. FIG. 8 illustrates a diagrammatic representation of a machine in the example form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a server, such as network monitor device 102 running classifier 700 to classification of one or more entities and communicate with a cloud based classification resource, as described herein.

The exemplary computer system 800 includes a processing device 802, a main memory 804 (e.g., read-only memory (ROM), flash memory, dynamic random access memory (DRAM), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826, which may be one example of classifier 700 shown in FIG. 7, for performing the operations and steps discussed herein.

The data storage device 818 may include a machine-readable storage medium 828, on which is stored one or more set of instructions 822 (e.g., software) embodying any one or more of the methodologies of operations described herein, including instructions to cause the processing device 802 to execute classifier 700. The instructions 822 may also reside, completely or at least partially, within the main memory 804 or within the processing device 802 during execution thereof by the computer system 800; the main memory 804 and the processing device 802 also constituting machine-readable storage media. The instructions 822 may further be transmitted or received over a network 820 via the network interface device 808.

The machine-readable storage medium 828 may also be used to store instructions to perform a method for classification (e.g., using local and cloud based classification), as described herein. While the machine-readable storage medium 828 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   accessing network traffic from a network;
   selecting an entity;
   determining one or more values associated with one or more properties associated with the entity, wherein the one or more values are accessed from the network traffic;
   determining, by a processing device, a first classification result of the entity based on accessing one or more local profiles;
   in response to the first classification result meeting a condition, sending the one or more values associated with one or more properties associated with the entity;
   receiving a second classification result, wherein the second classification result is determined based on accessing at least one remote profile; and
   storing at least one of the first classification result or the second classification result.

2. The method of claim 1, wherein the condition comprises at least one of being unclassified, a confidence associated with the first classification result being below a confidence threshold, or a granularity associated with the first classification being below a granularity threshold.

3. The method of claim 1 further comprising:
   performing an action based on at least one of the first classification result or the second classification result.

4. The method of claim 1, wherein the sending comprises sending the one or more values associated with one or more properties associated with the entity to at least one of a cloud resource or a cloud classification engine.

5. The method of claim 1 further comprising:
   in response to the first classification result being a classification of the entity, determining whether a profile associated with the first classification result is the latest profile available.

6. The method of claim 5 further comprising:
   in response to the first classification result being a classification of the entity and the profile associated with the first classification result being the latest profile available, determining whether the first classification result is above at least one of a granularity threshold or a confidence threshold.

7. The method of claim 1, wherein the second classification result is based on at least one of a proximity based classification or a machine learning based classification.

8. The method of claim 1, wherein the one or more local profiles comprise a plurality of profiles selected based on popularity.

9. The method of claim 1 further comprising:
   receiving a selection of at least one of a vertical or a profile package; and
   accessing the one or more profiles based on at least one of the vertical or the profile package.

10. The method of claim 1, wherein the sending of the one or more values associated with the entity further comprises encoding the one or more values associated with the entity.

11. A system comprising:
a memory; and
a processing device, operatively coupled to the memory, to:
access network traffic from a network;
select an entity;
determine one or more values associated with one or more properties associated with the entity, wherein the one or more values are accessed from the network traffic;
determine, by a processing device, a first classification result of the entity based on accessing one or more local profiles;
in response to the first classification result meeting a condition, send the one or more values associated with one or more properties associated with the entity;
receive a second classification result, wherein the second classification result is determined based on accessing at least one remote profile; and
store at least one of the first classification result or the second classification result.

12. The system of claim 11, wherein the condition comprises at least one of being unclassified, a confidence associated with the first classification result being below a confidence threshold, or a granularity associated with the first classification being below a granularity threshold.

13. The system of claim 11, the processing device further to:
perform an action based on at least one of the first classification result or the second classification result.

14. The system of claim 11, wherein to send, the processing device to send the one or more values associated with one or more properties associated with the entity to at least one of a cloud resource or a cloud classification engine.

15. The system of claim 11, the processing device further to:
in response to the first classification result being a classification of the entity, determine whether a profile associated with the first classification result is the latest profile available.

16. The system of claim 15, the processing device further to:
in response to the first classification result being a classification of the entity and the profile associated with the first classification result being the latest profile available, determine whether the first classification result is above at least one of a granularity threshold or a confidence threshold.

17. The system of claim 11, wherein the second classification result is based on at least one of a proximity based classification or a machine learning based classification.

18. The system of claim 11, wherein the one or more local profiles comprise a plurality of profiles selected based on at least one of popularity, a vertical, or a profile package.

19. A non-transitory computer readable medium having instructions encoded thereon that, when executed by a processing device, cause the processing device to:
access network traffic from a network;
select an entity;
determine one or more values associated with one or more properties associated with the entity, wherein the one or more values are accessed from the network traffic;
determine, by the processing device, a first classification result of the entity based on accessing one or more local profiles;
in response to the first classification result meeting a condition, send the one or more values associated with one or more properties associated with the entity;
receive a second classification result, wherein the second classification result is determined based on accessing at least one remote profile; and
store at least one of the first classification result or the second classification result.

20. The non-transitory computer readable medium of claim 19, wherein the condition comprises at least one of being unclassified, a confidence associated with the first classification result being below a confidence threshold, or a granularity associated with the first classification being below a granularity threshold.

* * * * *